US011913232B2

(12) United States Patent
Wagner et al.

(10) Patent No.: US 11,913,232 B2
(45) Date of Patent: Feb. 27, 2024

(54) HANDLE ASSEMBLY

(71) Applicant: Driploc, Inc., Oklahoma City, OK (US)

(72) Inventors: Barry E. Wagner, Oklahoma City, OK (US); Benjamin P. Glenn, Oklahoma City, OK (US)

(73) Assignee: Driploc, Inc., Oklahoma City, OK (US)

( * ) Notice: Subject to any disclaimer, the term of this patent is extended or adjusted under 35 U.S.C. 154(b) by 251 days.

(21) Appl. No.: 17/558,684

(22) Filed: Dec. 22, 2021

(65) Prior Publication Data

US 2022/0282491 A1 Sep. 8, 2022

Related U.S. Application Data

(63) Continuation-in-part of application No. 17/193,230, filed on Mar. 5, 2021, now Pat. No. 11,788,745.

(51) Int. Cl.

| | |
|---|---|
| ***F24F 7/02*** | (2006.01) |
| ***E04D 13/17*** | (2006.01) |
| ***F24F 13/14*** | (2006.01) |
| *E05D 11/10* | (2006.01) |

(52) U.S. Cl.

CPC .............. *E04D 13/17* (2013.01); *F24F 7/025* (2013.01); *F24F 13/1413* (2013.01); *F24F 13/1486* (2013.01); *E05D 11/10* (2013.01)

(58) Field of Classification Search

CPC ... B60P 7/0807; B65D 25/2841; A45C 13/26; F24F 7/025; F24F 13/1413

See application file for complete search history.

(56) References Cited

U.S. PATENT DOCUMENTS

| | | | | |
|---|---|---|---|---|
| 1,864,168 | A * | 6/1932 | Bridge | B65D 25/2858 16/DIG. 15 |
| 1,911,314 | A * | 5/1933 | Gunkle | A47J 45/072 294/170 |
| 2,036,513 | A * | 4/1936 | Wagner | E05D 5/06 16/241 |
| 5,937,480 | A * | 8/1999 | Kiefer | E05D 7/121 16/272 |
| 6,592,310 | B2 * | 7/2003 | Hyp | B60P 7/0807 296/65.13 |
| 7,686,551 | B2 * | 3/2010 | Grasso | B60P 7/0807 410/112 |
| 8,636,289 | B2 * | 1/2014 | Skijus | B62B 1/20 280/47.31 |
| 9,045,070 | B2 * | 6/2015 | Pauluk | B29C 45/16 |
| 9,278,782 | B2 * | 3/2016 | Fjelland | B65D 25/2841 |

* cited by examiner

*Primary Examiner* — Brian E Glessner
*Assistant Examiner* — Daniel J Kenny
(74) *Attorney, Agent, or Firm* — Baker Donelson Bearman Caldwell & Berkowitz, PC

(57) ABSTRACT

A handle assembly includes a pair of mounting brackets and a handle pivotally coupled to the mounting brackets. Each mounting bracket has a U-shaped mounting member and a hook shaped clamping plate coupled to the U-shaped mounting member through threaded tension bolts. The mounting bracket also has a pair of mounting flanges with handle holes through which extends inwardly turned ends of the handle.

10 Claims, 10 Drawing Sheets

HANDLE ASSEMBLY

CROSS REFERENCE TO RELATED APPLICATIONS

This is a continuation-in-part of U.S. patent application Ser. No. 17/193,230 filed Mar. 5, 2021 and entitled "Hinge Assembly", and is incorporated herein by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

FIELD OF THE INVENTION

The invention relates generally to handle assemblies, and more particularly to a handle assembly for hinged lids which support the rooftop ventilator.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

In commercial ventilation systems for buildings, exhaust fans are mounted over vents on a roof. For example, a fan-assisted vent at a restaurant permits an exhaust to be withdrawn from the kitchen. Through this vent, grease and other cooking residue are allowed to leave the building. After a period of use, the vent, duct and fan become contaminated with grease. Other cooking residue also becomes adhered to the fan blades and other surfaces. Such residue can be flammable and presents a fire hazard, and can also attract undesirable microbes and illness-causing bacteria, requiring occasional cleaning.

In most of these systems, a rectangular base housing rises above the roof vent, and the open base housing is covered by a rectangular or square lid. The lid is sometimes referred to as a shoebox lid, because it is similar in construction to a cardboard shoebox, but formed from sheet metal. A large hole exists in the lid, and the fan is securely mounted to the lid. The National Fire Protection Association (NFPA) 96 "Standard for Ventilation Control and Fire Protection of Commercial Cooking Operations", federal, county, city, and local codes require fans and duct work to be inspected, cleaned if necessary, and maintained. Additionally, it is required that the hinged upblast fan include service hold open retainer to permit inspection and cleaning for the commercial cooking equipment. For maintenance purposes, the lid is typically hinged to the base housing, allowing a worker to raise the lid and rotate the lid and fan assembly away from the base housing for proper access.

The problem for many workers is that the lid can be difficult to grasp, requiring the worker to lift the edges of the lid with their fingers, and then rotate the heavy fan and lid assembly back into a fixed open position. A similar difficulty exists when closing the lid when the work is finished, because the worker must grip the side of the lid and gently allow it to close, being careful not to get their fingers or other body parts pinched between the lid and the base housing. Furthermore, the lid itself can be somewhat flexible, and it may become deformed or otherwise misshapen over the course of time and extensive use, resulting in an imprecise fit between the lid and the base housing.

Therefore, there is a need for a device which can be attached to the lid that allows for easier and safer opening and closing of the lid when maintenance is required. The device should be simple to install and use, and it should not require any irreversible modifications, such as drilling for fasteners, to the lid itself.

BRIEF SUMMARY OF THE INVENTION

In a preferred form of the invention, a handle assembly comprises a mounting bracket having a U-shaped member with a front wall and a rear wall defining a lid sidewall channel therebetween. The rear wall has pair of mounting flanges with a handle hole therethrough. The mounting bracket also has a clamping plate adjustably mounted to the rear wall of the U-shaped member. The clamping plate has a support member overlying the rear wall and an abutment flange extending from the support member and overhanging the lid sidewall channel. The handle assembly also has a handle or grip extending through the handle holes of the mounting bracket.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF CERTAIN EMBODIMENTS

Figure 1:
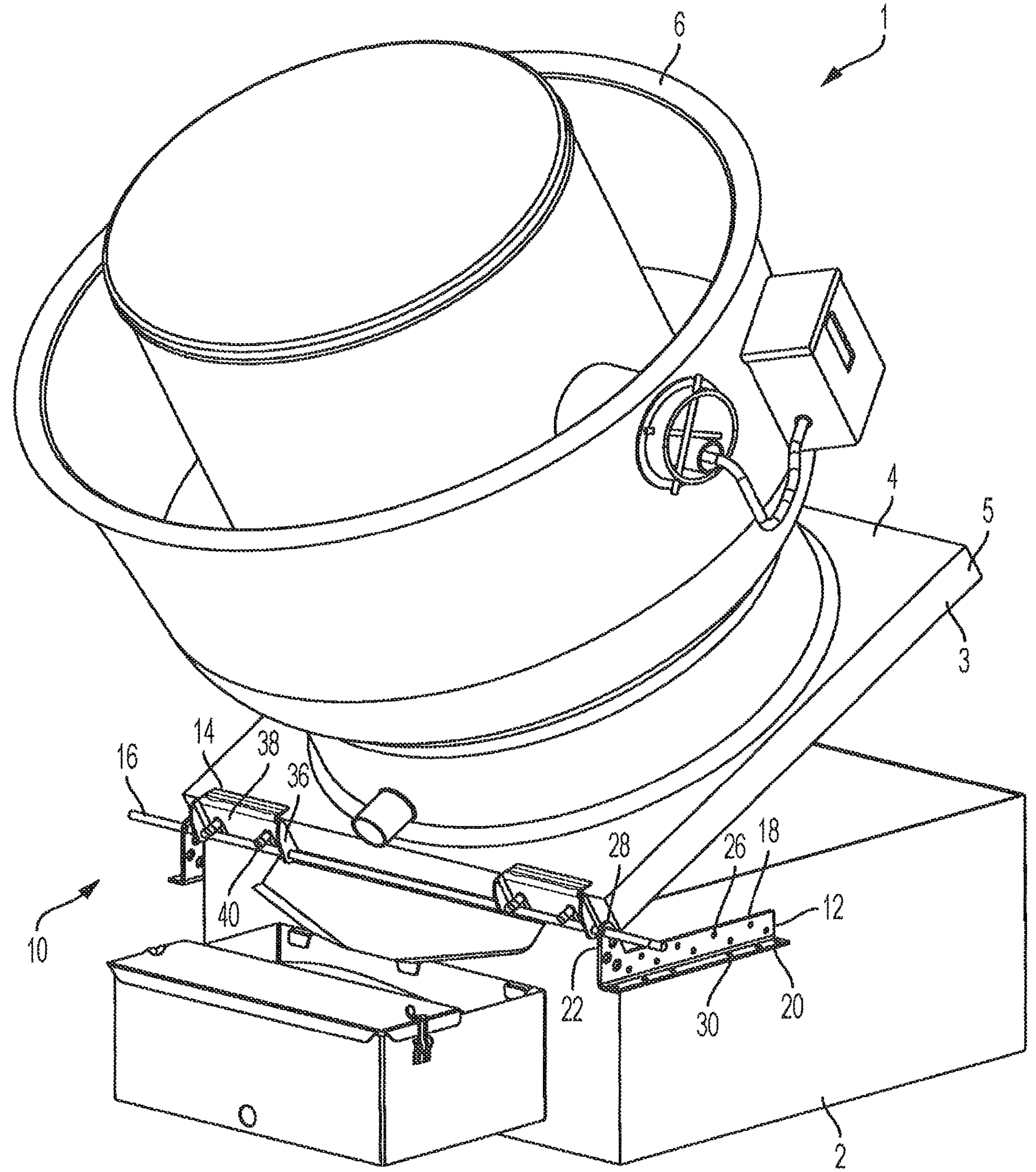
FIG. 1 is a perspective view of the hinge assembly embodying principles of the invention in a preferred form, shown mounted to the side surface of a conventional roof ventilation system having a fan base housing with vertical sidewalls.
Figure 2:
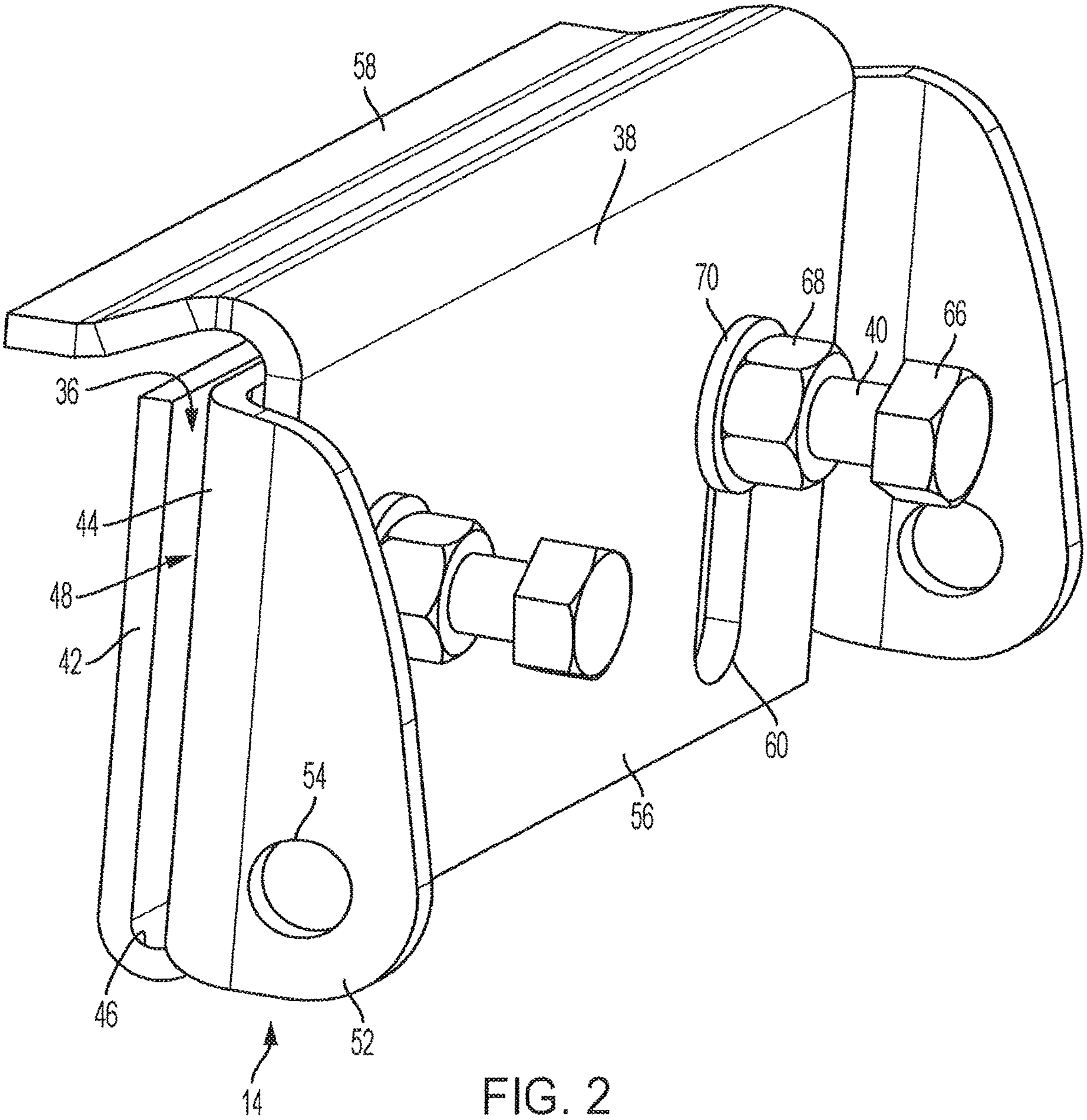
FIG. 2 is a perspective view of an upper hinge leaf of the hinge assembly of FIG. 1.
Figure 3:
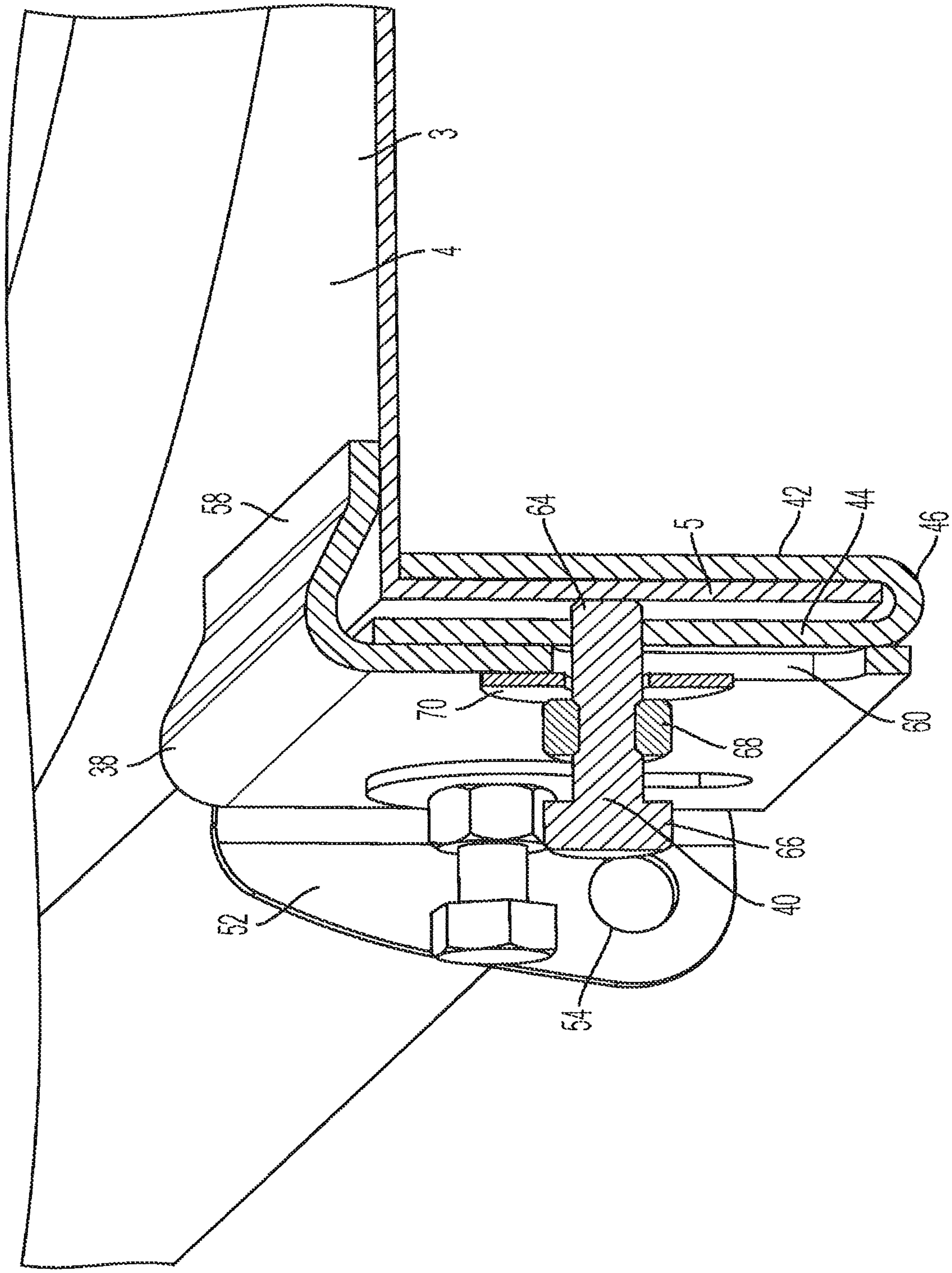
FIG. 3 is a perspective view of a clamping plate of the hinge assembly of FIG. 1.
Figure 4:
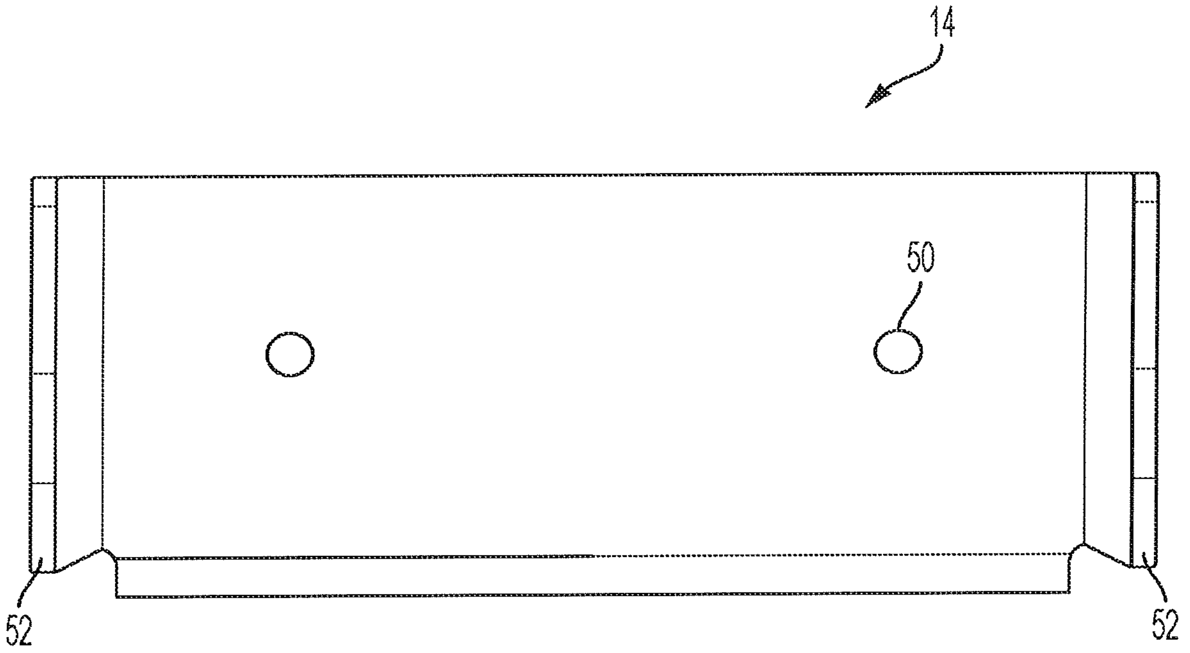
FIG. 4 is a rear view of a U-shaped mounting member of the hinge assembly of FIG. 1.
Figure 5:
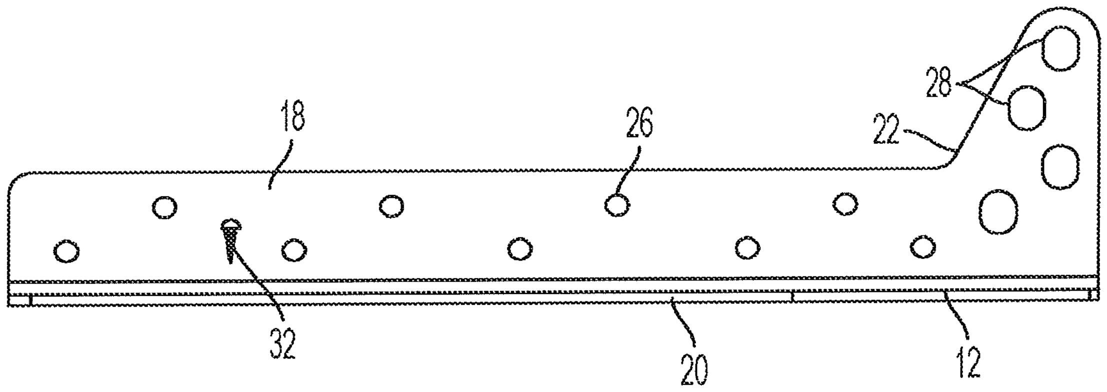
FIG. 5 is a side view of a lower mounting bracket of the hinge assembly of FIG. 1.

With reference next to the drawings, there is shown a hinge assembly 10 in a preferred form of the invention. In one form of the invention, the hinge assembly 10 is utilized with a conventional roof ventilation system 1 that includes a fan base housing or curb 2, a showbox-style lid 3 having a top lid surface 4 and peripheral downwardly extending sides or sidewalls 5, and a ventilation fan 6.

The hinge assembly 10 includes a pair of lower mounting brackets 12, at least two upper hinge leaves 14, and an axle rod or axle 16 pivotally coupling the upper hinge leaves 14 to the lower mounting brackets 12.

Each lower mounting bracket 12 has an elongated vertical portion or flange 18 and an elongated horizontal portion or flange 20 extending perpendicularly to the vertical flange 18. The vertical flange 18 includes an upwardly extending projection 22. Each vertical flange 18 has a series of screw mounting holes 26 and a series of vertically oval-shaped or elongated axle holes 28 extending therethrough. The terms vertical oval, vertically oval-shaped, or the like, is intended to mean that the longer or major axis of the oval is oriented generally vertically while the shorter or minor axis of the oval is oriented generally horizontally. Each horizontal flange 20 also has a series of screw mounting holes 30 therethrough. Mounting screws 32 are passed through either vertical flange screw mounting holes 26 or horizontal flange screw mounting holes 30 and into the fan base housing 2. The determination of which screw mounting holes 26 or 30 to utilize depends of which surface of the roof ventilation system 1 the hinge assembly 10 is to be mounted.

Each upper hinge leaf 14 includes a J-shaped or U-shaped mounting portion or member 36 and a hook or L-shaped clamping plate 38 adjustably coupled for varied vertical positioning to the U-shaped member 36 through a pair of threaded tension bolts 40. The U-shaped member 36 has a front wall or plate 42 integrally extending to a rear wall or plate 44 along a bight or bend 46 so as to define a lid sidewall channel 48 therebetween. The rear wall 44 has a pair of internally threaded bolt mounting holes 50 therethrough configured to receive the threaded end of the tension bolt 40. A pair of mounting side walls, flanges or ears 52 extend perpendicularly from the rear wall 44. Each mounting ear 52 has a circular axle hole 54 therethrough that is alignable with the elongated axle hole 28 of the lower mounting bracket vertical flange 18.

Each clamping plate 38 has a vertical wall, member, or plate 56 extending to an abutment flange 58 extending generally perpendicularly to the vertical wall 56. The vertical wall 56 has two elongated bolt adjustment slots 60 extending therethrough. The bolt adjustment slots 60 are generally alignable with the bolt mounting holes 50 of the upper hinge leaf rear wall 44.

Each tension bolt 40 has an externally threaded shaft 64, a bolt head 66, a tensioning nut 68 threadably mounted to the threaded shaft 64 for threaded movement there along. A washer 70 is also coupled to the threaded shaft 64 between the tensioning nut 68 and the clamping plate 38. The shafts 64 of the tension bolts 40 extend through the washers 70 and the elongated slots 60 and are threaded into the internally threaded bolt mounting holes 50.

The axle 16 extends through the elongated axle holes 28 of the lower mounting bracket vertical flange 18 and through the circular axle holes 54 of the U-shaped member mounting ears 52. A locking washer or cap 72 is coupled to the ends of the axle to prevent the accidental removal of the axle 16.

All components of the hinge assembly 10 may be made of conventionally know materials, such as aluminum, stainless steel, galvanized steel, nickel plated steel, or the like.

In use, the U-shaped member 36 is coupled to the sidewall 5 of the lid 3 of the fan base housing 2. With the tension bolts 40 only slightly threaded into bolt mounting holes 50, or removed altogether, the lid 3 bottom edge is inserted into the lid sidewall channel 48. The tension bolts 40 are then tightened so that the ends of the bolt shafts 64 bear against the sidewalls 5 of the lid 3, thus coupling the upper hinge leaves 14 to the lid 3. The hook shaped clamping plate 38 is then positioned so that the abutment flange 58 abuts the top surface 4 of the lid 3. The tensioning nuts 68 are then threaded down the bolt shaft 64 of tension bolts 40 until they bear against the outboard surface of the vertical wall 56 of the clamp plate 38. As such, the lid 3 is securely captured or encapsulated between the U-shaped member 36 and the clamping plate 38, thereby securely locking the position of the upper hinge leaves 14 upon the lid 3.

With the lid 3 in its closed position, the lower mounting brackets 12 are then pivoted about axle 16 and into a position wherein the vertical flange 18 abuts the fan base housing 2, as shown in FIG. 1. Mounting screws 32 are passed through screw mounting holes 26 and threaded into fan base housing 2 to secure the position of the lower mounting brackets 12 to the fan base housing 2.

The lid 3 and the accompanying ventilation fan 6 may now be pivoted between a closed position and an open position through operation of the hinge assembly 10. Specifically, the upper hinge leaves 14 rotate or pivot about axle 16, as the axle 16 passes through axle holes 54 within the ears 52 of the U-shaped member 36. Although the axle 16 passes through an oval shaped axle mounting hole 28 within the vertical flange 18, the axle 16 remains in a stable position. A conventional limiting chain 7 may be utilized to limit or act as a hold open retainer the pivoting of the lid 3.

As such, a hinge assembly comprises a pair of upper hinge leaves wherein each upper hinge leaf has a U-shaped member with a pair of mounting flanges having first axle holes therethrough. Each upper hinge leaf also has a clamping plate adjustably mounted to the U-shaped member. The hinge assembly also has a pair of lower mounting brackets, wherein each lower mounting bracket has at least one second axle hole therethrough. The hinge assembly also has an axle extending through the first axle holes of the pair of upper hinge leaves and through the second axle holes of the pair of lower mounting brackets.

Figure 6:
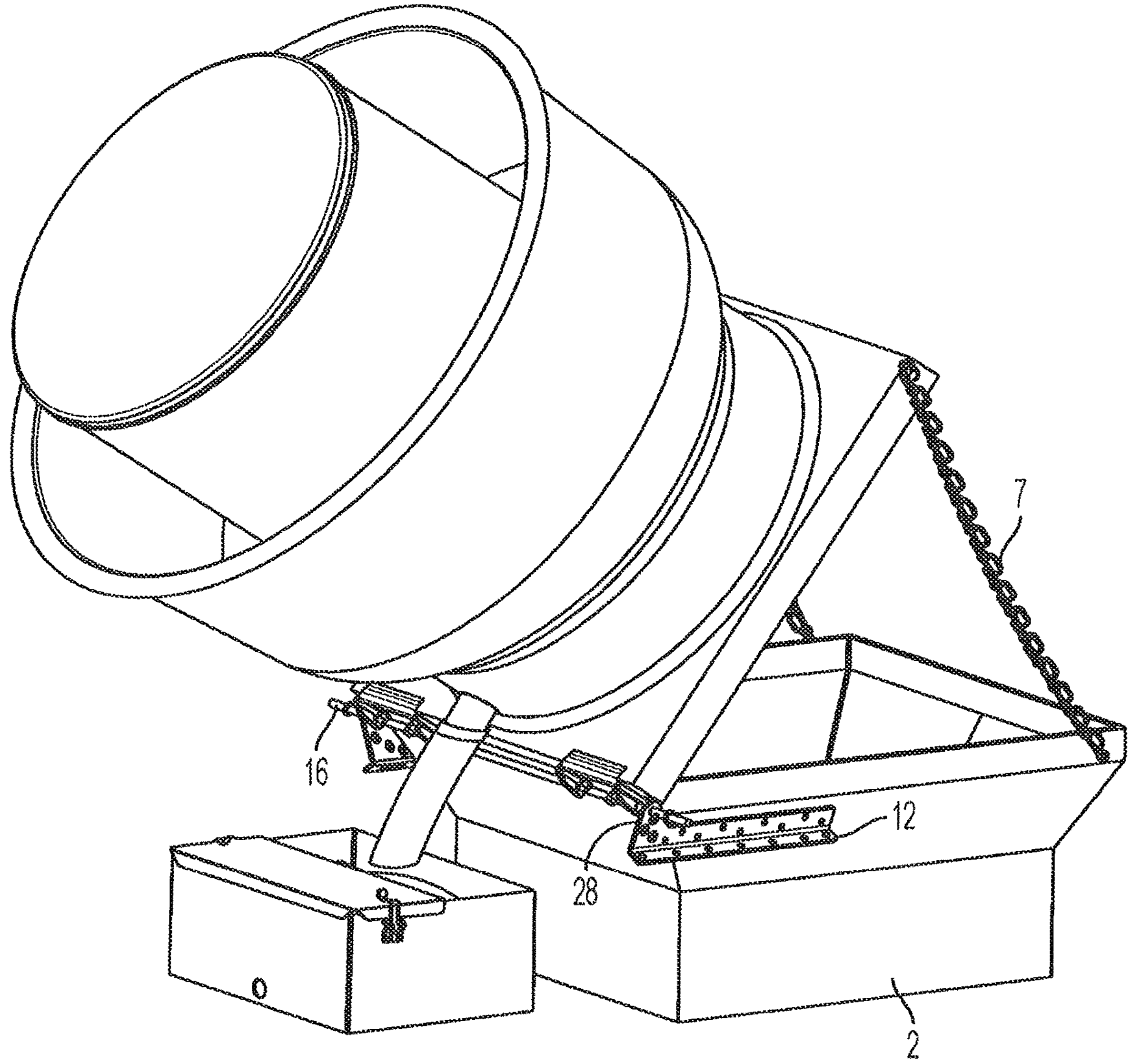
FIG. 6 is a perspective view of the hinge assembly embodying principles of the invention in another preferred form, shown mounted to the side surface of a conventional roof ventilation system having a fan base housing with angled sidewalls.

Alternatively, the lower mounting bracket 12 may be mounted to an angled fan base housing 2, as shown in FIG. 6. Here, the mounting procedure is essentially the same as that just described. However, as the lower mounting brackets 12 are set at an angle corresponding to that of the angled fan base housing 2, the oval shape of the axle holes 28 allows the passage and seating of the axle within the axle holes 28 while maintaining a snug fit thereon. Without such an oval shape, a circular shape of the axle 16 would bind on the axle hole, i.e., a circular axle hole set at an angle would not properly accommodate a circular axle therein.

Figure 7:
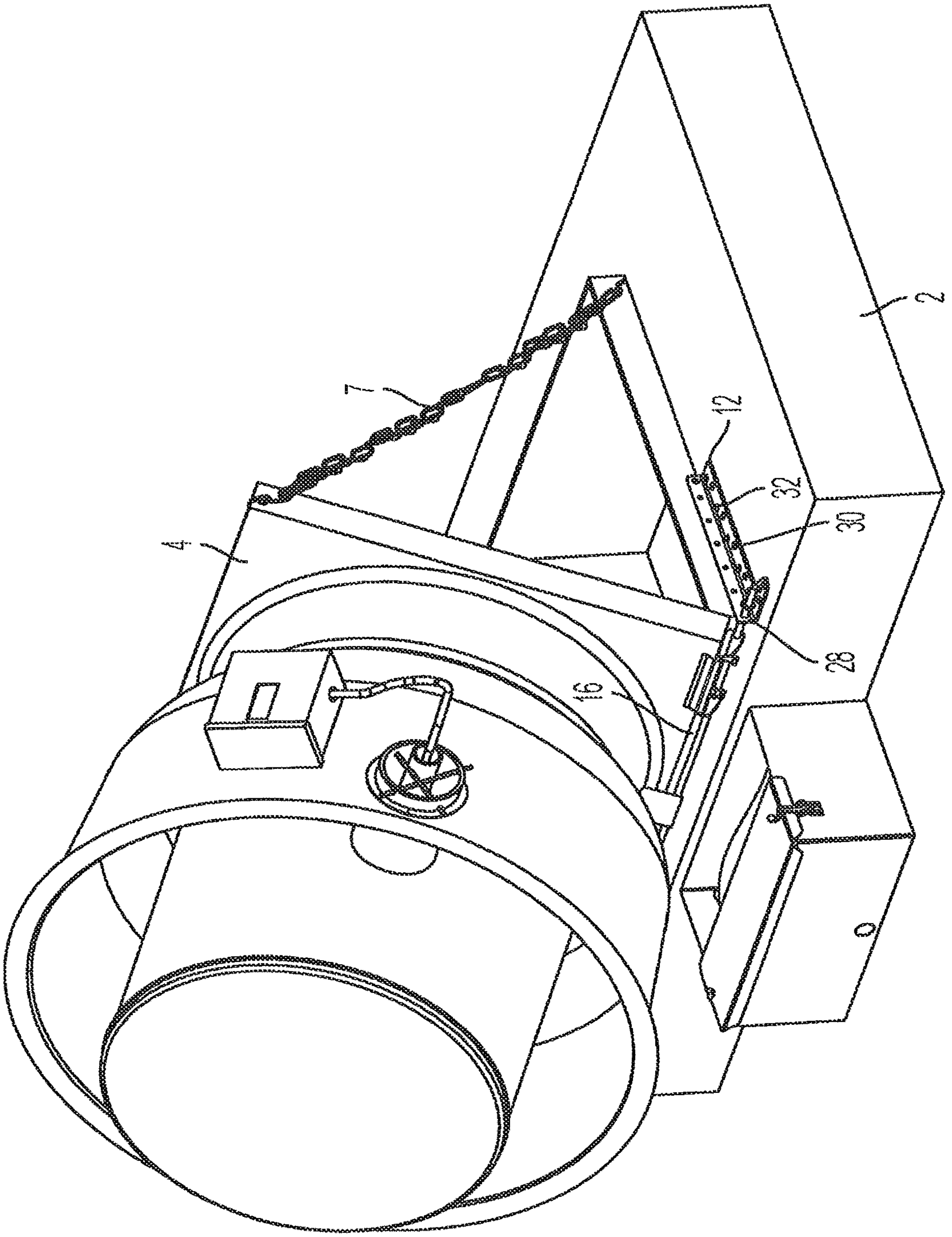
FIG. 7 is a perspective view of the hinge assembly embodying principles of the invention in another preferred form, shown mounted to a top surface of a conventional roof ventilation system having a fan base housing.

As another alternative mounting, the lower mounting brackets 12 are pivoted about axle 16 and into a position wherein the horizontal flange 20 abuts the top surface 4 of the lid 3 of the fan base housing 2, as shown in FIG. 7. Here, the mounting screws 32 are passed through screw mounting holes 30 and threaded into a top surface or deck 4 of the fan base housing 2.

Figure 8:
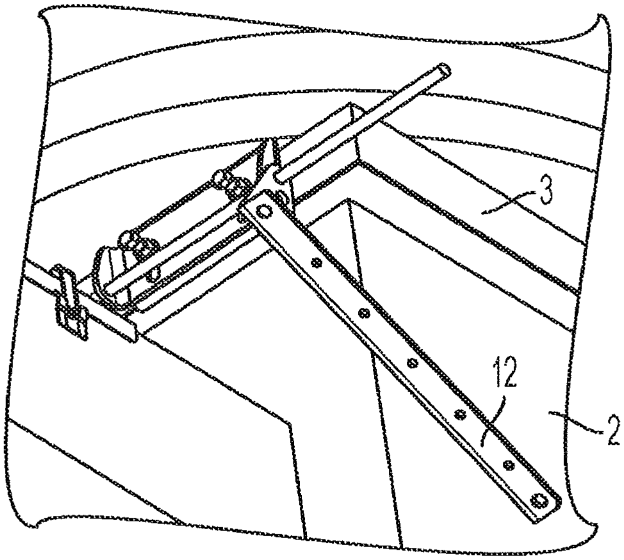
FIG. 8 is a perspective view of the hinge assembly embodying principles of the invention in another preferred form, shown mounted to the conventional roof ventilation system with an elongated bracket.

As another alternative mounting, the lower mounting brackets 12 are mounted to at an angle or incline, as shown in FIG. 8.

Figure 9:
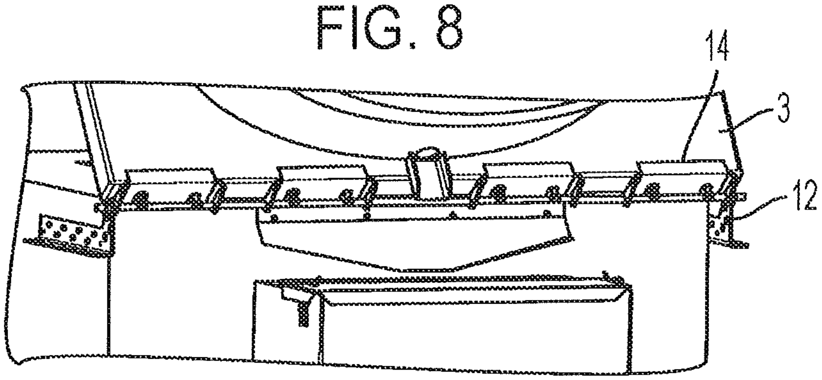
FIG. 9 is a perspective view of the hinge assembly embodying principles of the invention in another preferred form.

As another alternative mounting, there are four upper mounting leaves 14, as shown in FIG. 9.

Figure 10:
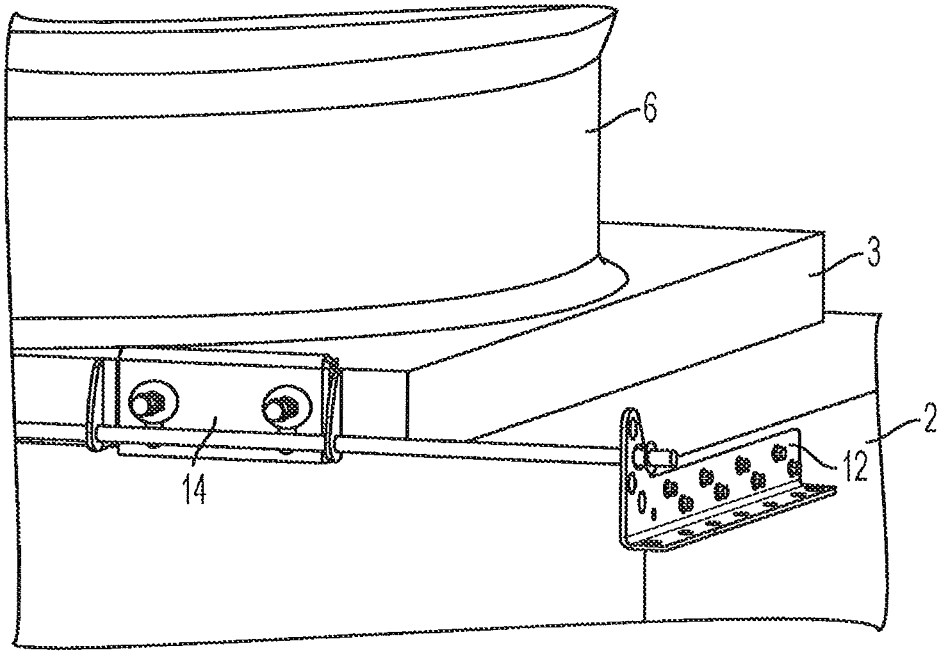
FIG. 10 is a perspective view of a handle assembly embodying principles of the invention in another preferred form.
Figure 11:
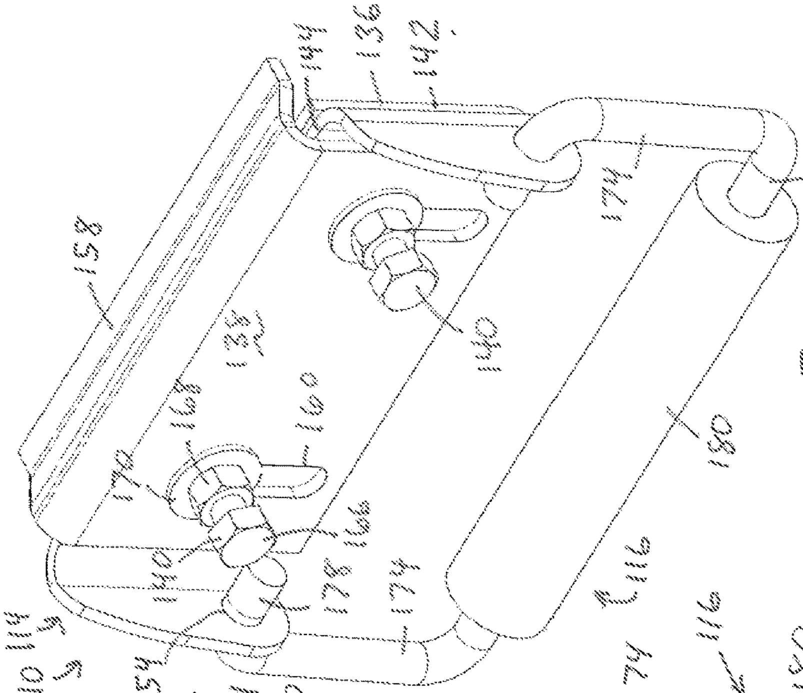
FIG. 11 is a perspective view of a handle assembly embodying principles of the invention in another preferred form.
Figure 12:
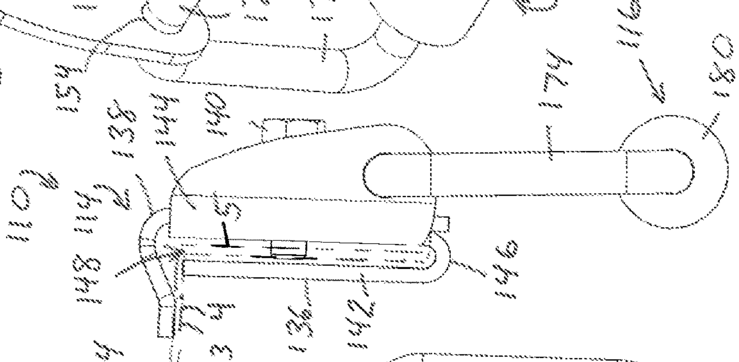
FIG. 12 is a side view of the handle assembly of FIG. 11, shown mounted to the side surface of a lid portion of a conventional roof ventilation system.
Figure 13:
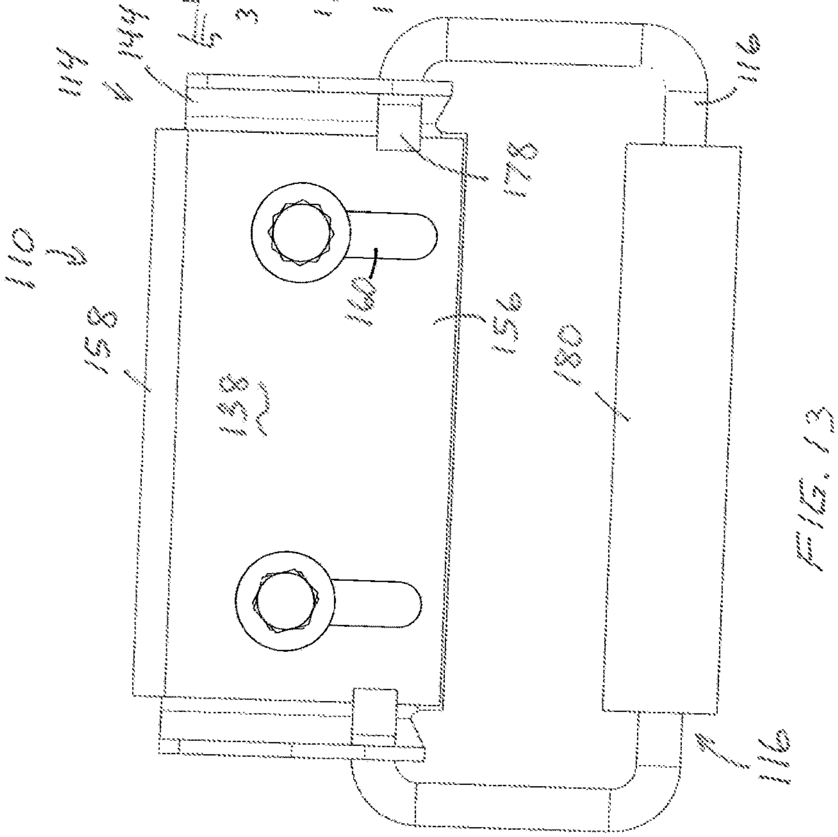
FIG. 13 is a front view of the handle assembly of FIG. 11
Figure 14:
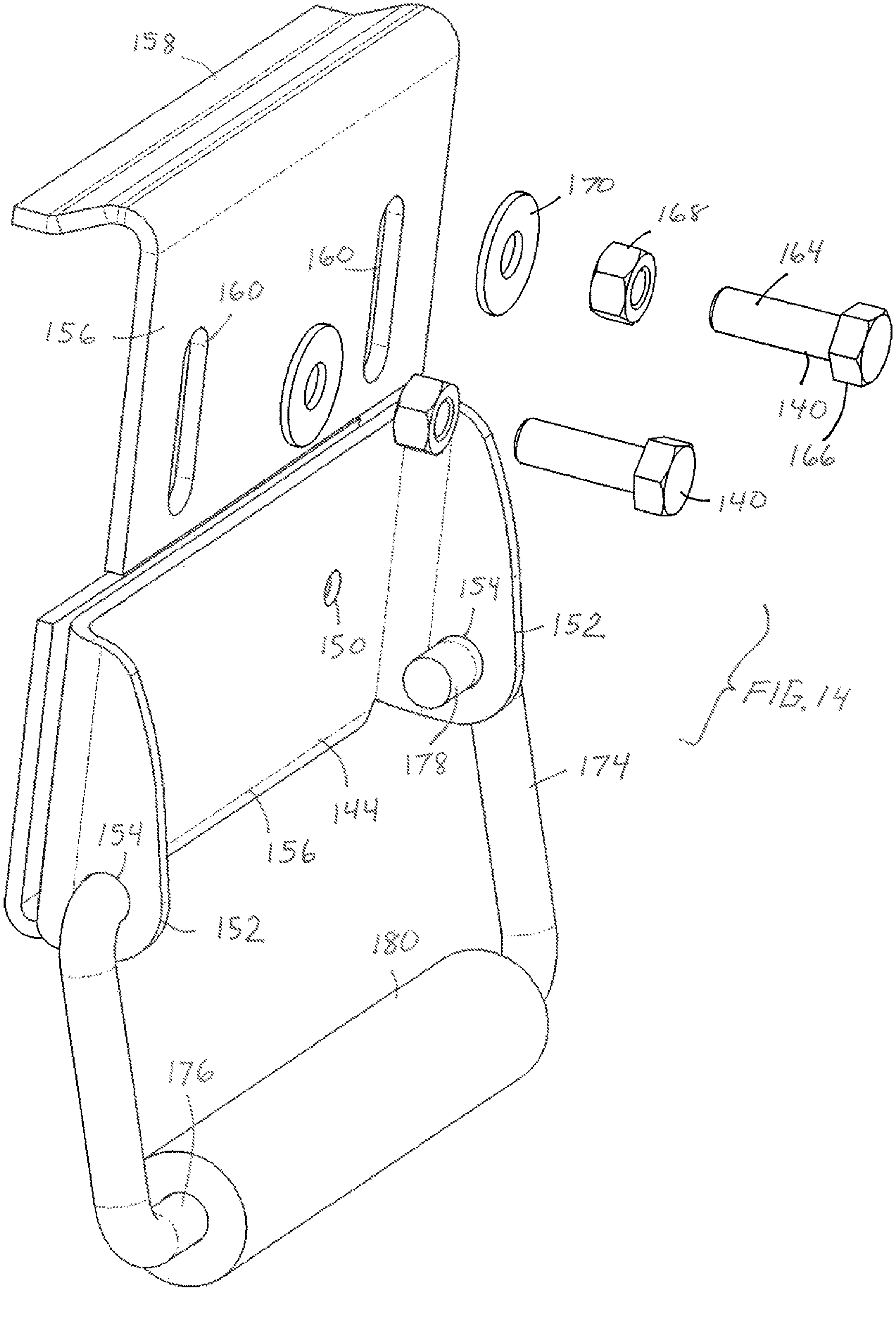
FIG. 14 is an exploded, perspective view of the handle assembly of FIG. 11.
Figure 15:
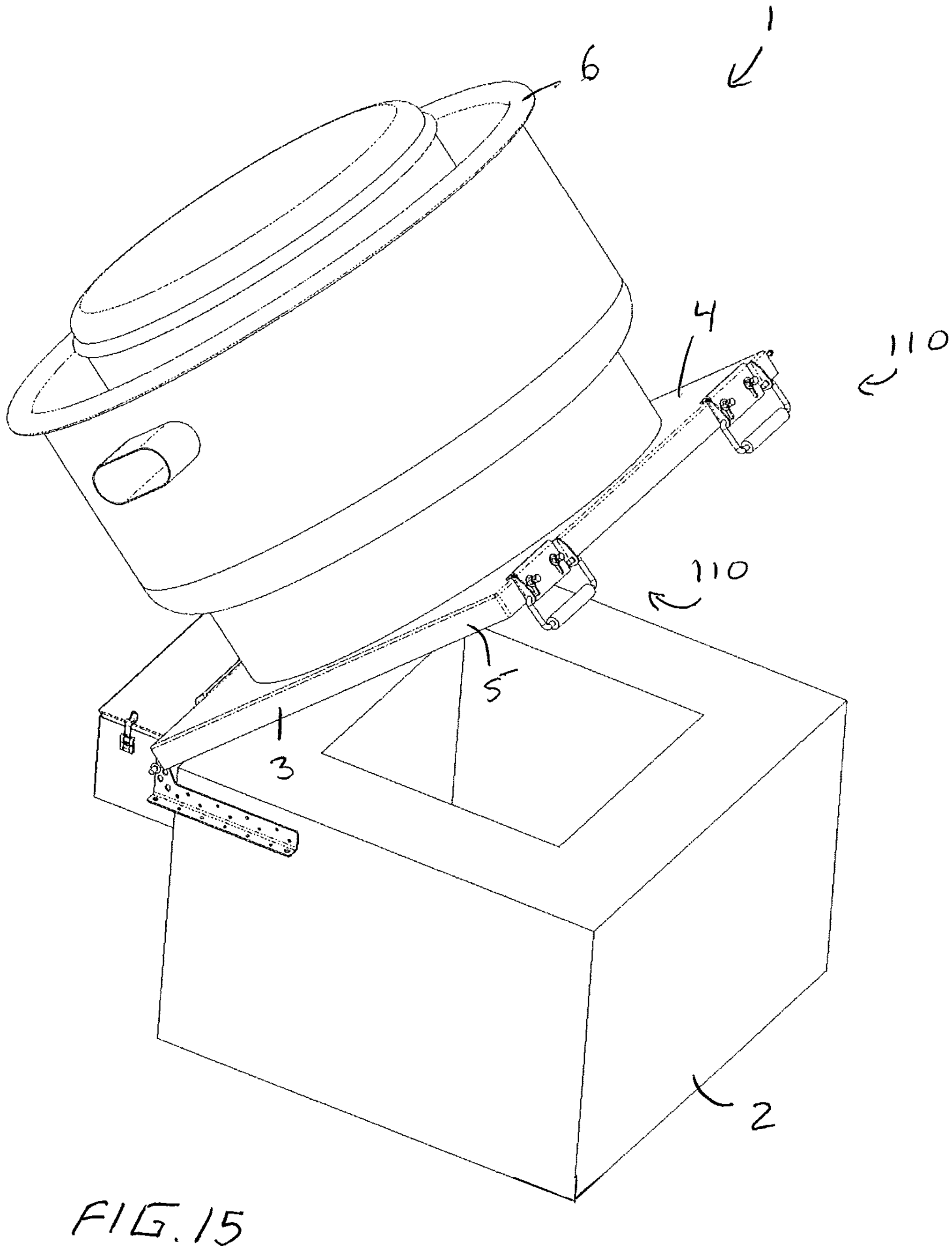
FIG. 15 is a perspective view of the handle assembly of FIG. 11 shown mounted to the side surface of a conventional roof ventilation system having a fan base housing with vertical sidewalls.

As another alternative mounting, the lower mounting brackets 12 are mounted to the curbs that are more narrow or wider than the fan base 2, as shown in FIG. 10.

It should be understood that the axle hole 54 of the U-shaped member 36 is oriented or positioned above and offset from the bottommost portion of the U-shaped member 36 in the area of bight 46. With this orientation, the pivoting motion of the upper hinge leaves 14 causes the immediate rising of the bottommost portion. This offset and resulting motion allows for a minimum height requirement or clearance so that the upper hinge leaves 14 do not contact the underlying fan base housing 2.

It should be understood that by capturing the lid 3 between the U-shaped member 36 and the clamping plate 38, the hinge assembly 10 provides a greater degree of safety from accidental separating or slipping of the lid from the hinge. This mounting also eliminates the need to penetrate the lid with mounting screws, which may cause weakness in the lid or allow water intrusion.

It should also be understood that the present hinge assembly allows for additional upper hinge leaves 14 to be mounted to the axle 16 to provide greater strength. For example, with heavier ventilation fans, additional upper hinge leaves 14 may be coupled to the axle 16 to spread out the amount of weight, torqueing, or load upon each upper hinge leaf 14, i.e., the hinge assembly is not limited to only two upper hinge leaves 14. The additional upper hinge leaves 14 may also prolong the service life of the fan base housing 2, lid 3 and ventilation fan 6 by providing additional strength, stability, and security.

Lastly, it should be understood that while the hinge assembly 10 has been shown coupled to the housing of a roof ventilation system, the hinge assembly 10 may also be utilized in another applications, environments, or the like.

With reference next to FIGS. 11-15, there is shown a handle assembly 110 in a preferred form of the invention. In one form of the invention, the handle assembly 110 is utilized with the previously described conventional roof ventilation system 1 that includes a fan base housing or curb 2, a showbox-style lid 3 having a top lid surface 4 and peripheral downwardly extending sides or sidewalls 5, and a ventilation fan 6.

Typically, the ventilation system 1 includes two handle assemblies per lid 3, but may include only one handle assembly should the configuration and specifications of the ventilation system 1 allow for such. The handle assembly 110 includes a mounting bracket 114, previously described as upper hinge leaf, and a handle grip 116 pivotally coupled to the mounting bracket 114.

The mounting bracket 114 includes a J-shaped or U-shaped mounting portion or member 136 and a hook or L-shaped clamping plate 138 adjustably coupled for varied vertical positioning to the U-shaped member 136 through a pair of threaded tension bolts 140. The U-shaped member 136 has a front wall or plate 142 integrally extending to a rear wall or plate 144 along a bight or bend 146 so as to define a lid sidewall channel 148 therebetween. The rear wall 144 has a pair of internally threaded bolt mounting holes 150 therethrough configured to receive the threaded end of the tension bolt 140, described hereinafter. A pair of mounting side walls, flanges or ears 152 extend perpendicularly from the rear wall 144. Each mounting ear 152 has a circular handle hole 154 therethrough.

The clamping plate 138 has a vertical support wall, member, or plate 156 extending to a horizontal abutment flange 158 that is positioned or extends generally perpendicularly to the vertical support wall 156 and overhanging the lid sidewall channel 148. The vertical support wall 156 has two elongated bolt adjustment slots 160 extending therethrough. The bolt adjustment slots 160 are generally alignable with the bolt mounting holes 150 of the mounting bracket rear wall 144.

Each tension bolt 140 has an externally threaded shaft 164, a bolt head 166, and a tensioning nut 168 threadably mounted to the threaded shaft 164 for threaded movement there along. A washer 170 is also coupled to the threaded shaft 164 between the tensioning nut 168 and the clamping plate 138. The shafts 164 of the tension bolts 140 extend through the washers 170 and the elongated slots 160 and are threaded into the internally threaded bolt mounting holes 150, so as to extend into the lid sidewall channel 148.

The handle grip 116 is generally U-shaped with a pair of opposing legs 174 spanned by a horizontal bridge 176. Each leg 174 has an inwardly turned end or end portion 178. A grip portion 180 is journaled upon the horizontal bridge 176.

The inwardly turned ends 178 of the handle grip 116 extends through the circular handle holes 154 of the U-shaped member mounting ears 152.

All components of the handle assembly 110 may be made of conventionally know materials, such as aluminum, stainless steel, galvanized steel, nickel plated steel, or the like.

In use, the U-shaped member 136 is coupled to the sidewall 5 of the lid 3 of the fan base housing 2. With the tension bolts 140 only slightly threaded into bolt mounting holes 150, or removed altogether, the lid 3 bottom edge is inserted into the lid sidewall channel 148. The tension bolts 140 are then tightened so that the terminal ends of the bolt shafts 164 bear against the sidewalls 5 of the lid 3, thus fixedly coupling the mounting bracket 114 to the lid 3. The hook shaped clamping plate 138 is then moved down or re-positioned so that the abutment flange 158 abuts the top surface 4 of the lid 3, and thereby captures the lid 3 within the lid sidewall channel 148 between the bight 146 and the abutment flange 158. The tensioning nuts 168 are then threaded down the bolt shaft 164 of tension bolts 140 until the tensioning nuts 168 bear against the outboard surface of the vertical support wall 156 of the clamp plate 138. As such, the lid 3 is securely captured, pinched, clamped, or encapsulated between the U-shaped member 136 and the clamping plate 138, thereby securely locking the position of the mounting bracket 114 upon the lid 3.

The lid 3 and the accompanying ventilation fan 6 may now be pivoted between a closed position and an open position with the person grasping and pulling upon the handle assembly 110. Specifically, the handle grip 116 rotates about mounting bracket 114, as the handle inwardly turned ends 178 passes through handle holes 154 within the ears 152 of the U-shaped member 136, although the handle could be mounted in a fixed location relative to the mounting bracket 114. A conventional limiting chain 7 may be utilized to limit or act as a hold open retainer the pivoting of the lid 3.

It should be understood that other types of handles or grips may be utilized as an alternative to the handle shown in the drawings. For example, the handle may comprise of a bolted on cable assembly that is coupled to the handle holes 154.

The handle assembly comprises a mounting bracket having a U-shaped member with a front wall and a rear wall defining a lid sidewall channel therebetween. The rear wall has pair of mounting flanges with a handle hole therethrough. The mounting bracket also has a clamping plate adjustably mounted to the rear wall of the U-shaped member. The clamping plate has a support member overlying the rear wall and an abutment flange extending from the support member and overhanging the lid sidewall channel. The handle assembly also has a handle extending through the handle holes of the mounting bracket.

It will be understood that each of the elements described above, or two or more together may also find a useful application in other types of methods, applications, or environments differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A handle assembly comprising:

a mounting bracket having a U-shaped member with a front wall and a rear wall defining a channel therebetween, said rear wall having pair of mounting flanges wherein each mounting flange has a handle hole therethrough, said mounting bracket also having a clamping plate adjustably mounted to said rear wall of said U-shaped member, said clamping plate having a support member overlying said rear wall and an abutment flange extending from said support member and overhanging said channel, and a handle extending through said handle holes of said mounting bracket.

2. The handle assembly of claim 1 wherein said handle has two legs, each said leg having an inwardly turned end extending through one said handle hole.

3. The handle assembly of claim 1 wherein said U-shaped member includes at least one bolt mounting holes, wherein said clamping plate includes at least one bolt slot, and wherein said mounting bracket includes a mounting bolt extending through said at least bolt slot and threaded into said at least one bolt mounting hole.

4. The handle assembly of claim 3 wherein said mounting bolt has a threaded shaft, a head at one end of said shaft, and a threaded nut threadably received upon said threaded shaft, said shaft is threadably received within said bolt mounting hole and said nut may be biased against said clamping plate.

5. A handle assembly for use with a rooftop ventilator having a base housing, a lid operatively attached to the base housing, wherein the lid has a plurality of lid sides extending downwardly from a lid top surface, and a ventilation fan positioned above the lid surface, said handle assembly comprising:

at least one mounting bracket having a mounting member with a front wall integrally extending to a rear wall to form a lid channel therebetween, said mounting member having at least one mounting flange with a handle hole therethrough, said at least one mounting bracket also having a clamping plate coupled to said at mounting member, said clamping plate having an abutment flange extending over said lid channel to capture a lid side of the base housing lid within the lid channel between said mounting member and said abutment flange, and a handle extending through said handle hole of said mounting bracket.

6. The handle assembly of claim 5 wherein said mounting member has two mounting flanges each having a handle hole therethrough, and wherein said handle has two legs, each said leg having an inwardly turned end extending through one said handle hole.

7. The handle assembly of claim 5 wherein said rear wall includes at least one bolt mounting holes, wherein said clamping plate includes at least one bolt slot, and wherein said mounting bracket includes a mounting bolt extending through said at least one bolt slot and threaded into said at least one bolt mounting hole.

8. The handle assembly of claim 7 wherein said mounting bolt has a threaded shaft, a head at one end of said shaft, and a threaded nut threadably received upon said threaded shaft, said shaft is threadably received within said bolt mounting hole and said nut may be biased against said clamping plate.

9. A handle assembly comprising:

a mounting bracket having a mounting member with a front wall and a rear wall defining a channel therebetween, said rear wall having a threaded bolt mounting hole extending therethrough, said mounting bracket also having a clamping plate with a support member and an abutment flange extending from said support member, said support member having a bolt mounting slot therethrough, said mounting bracket also having a threaded bolt extending through said mounting slot of said support member and threaded into said threaded bolt mounting holes as to extend partially into said channel;

a handle coupled to said mounting bracket.

10. The handle assembly of claim 9 wherein said mounting bolt has a threaded shaft, a head at one end of said shaft, and a threaded nut threadably received upon said threaded shaft, said shaft is threadably received within said bolt mounting hole and said nut may be threaded upon said threaded shaft to a position biased against said clamping plate.

* * * * *